US012718086B2

(12) United States Patent
Truong et al.

(10) Patent No.: US 12,718,086 B2
(45) Date of Patent: Aug. 25, 2026

(54) APPARATUS AND METHOD FOR REVISING CATEGORY CLASSIFICATION PREDICTIONS IN MACHINE LEARNING

(71) Applicant: Capital One Services, LLC, McLean, VA (US)

(72) Inventors: Anh Truong, Champaign, IL (US); Austin Grant Walters, Savoy, IL (US); Jeremy Edward Goodsitt, Champaign, IL (US)

(73) Assignee: Capital One Services, LLC, McLean, VA (US)

(*) Notice: Subject to any disclaimer, the term of this patent is extended or adjusted under 35 U.S.C. 154(b) by 1058 days.

(21) Appl. No.: 17/400,905

(22) Filed: Aug. 12, 2021

(65) Prior Publication Data

US 2023/0047184 A1 Feb. 16, 2023

(51) Int. Cl.

*G06N 3/08* (2023.01)
*G06F 18/2415* (2023.01)
*G06F 18/2431* (2023.01)
*G06N 3/045* (2023.01)

(52) U.S. Cl.

CPC ........... *G06N 3/08* (2013.01); *G06F 18/2415* (2023.01); *G06F 18/2431* (2023.01); *G06N 3/045* (2023.01)

(58) Field of Classification Search

CPC ...... G06N 3/08; G06N 3/045; G06F 18/2415; G06F 18/2431; G06F 18/24

See application file for complete search history.

(56) References Cited

U.S. PATENT DOCUMENTS

| | | | |
|---|---|---|---|
| 10,607,042 | B1 | 3/2020 | Dasgupta et al. |
| 10,705,796 | B1 | 7/2020 | Doyle |
| 10,891,673 | B1 | 1/2021 | Sawaf |
| 11,709,858 | B2 | 7/2023 | Aggarwal et al. |
| 2004/0075930 | A1 | 4/2004 | Sakai et al. |
| 2018/0137390 | A1 | 5/2018 | Brundage et al. |
| 2018/0189611 | A1 | 7/2018 | Dal Mutto et al. |
| 2019/0179858 | A1 | 6/2019 | Douze et al. |
| 2019/0236096 | A1 | 8/2019 | Dal Mutto et al. |

(Continued)

OTHER PUBLICATIONS

Author Unknown, “Word Embeddings”, Tensorflow [online]. Retrieved from Internet URL: <https://www.tensorflow.org/tutorials/text/word_embeddings>. Retrieved on Apr. 7, 2020, 18 pages.

*Primary Examiner* — Miranda M Huang
(74) *Attorney, Agent, or Firm* — KDW Firm PLLC

(57) ABSTRACT

Various embodiments are generally directed to techniques for prediction based machine learning (ML) models, such as to utilize a ML model to generate predictions based on the output of another ML model. Some embodiments are particularly directed to a secondary ML model that revises predictions generated by a primary ML model based on structured input data. In many embodiments, the secondary ML model may utilize predictions from the primary ML model to learn metadata regarding the structured input data. In many such embodiments, the metadata regarding the structured input data may be used to revise the predictions from the primary ML model. For example, the secondary ML model may utilize a structure of the input data combined with patterns in the predictions from the primary ML model to revise the predictions from the primary ML model.

20 Claims, 8 Drawing Sheets

(56) References Cited

U.S. PATENT DOCUMENTS

2019/0250891 A1 8/2019 Kumar et al.
2020/0012933 A1 1/2020 Truong et al.
2020/0125575 A1 4/2020 Ghoshal et al.
2020/0193206 A1 6/2020 Turkelson et al.
2020/0357137 A1 11/2020 Zakharov et al.
2021/0019558 A1 1/2021 Edge et al.
2021/0182596 A1 6/2021 Adams et al.
2021/0201112 A1* 7/2021 Gauthier Melançon .................... G06V 10/40
2021/0319004 A1 10/2021 Walters et al.
2023/0206069 A1* 6/2023 Zhang .................... G06N 3/045 706/15
2023/0351176 A1 11/2023 Darmour et al.

* cited by examiner

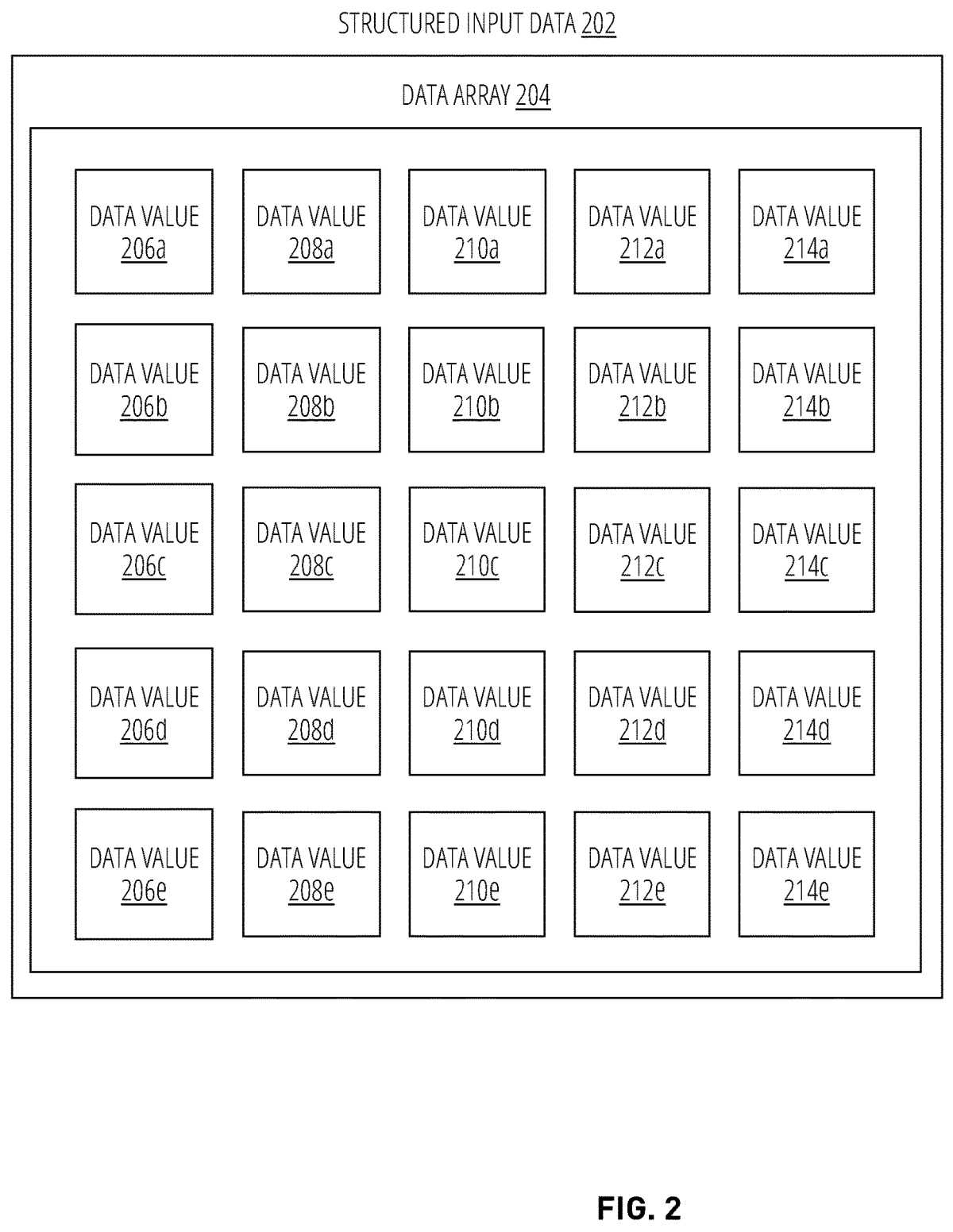

STRUCTURED INPUT DATA 202

DATA ARRAY 204

DATA VALUE 206a
DATA VALUE 208a
DATA VALUE 210a
DATA VALUE 212a
DATA VALUE 214a
DATA VALUE 206b
DATA VALUE 208b
DATA VALUE 210b
DATA VALUE 212b
DATA VALUE 214b
DATA VALUE 206c
DATA VALUE 208c
DATA VALUE 210c
DATA VALUE 212c
DATA VALUE 214c
DATA VALUE 206d
DATA VALUE 208d
DATA VALUE 210d
DATA VALUE 212d
DATA VALUE 214d
DATA VALUE 206e
DATA VALUE 208e
DATA VALUE 210e
DATA VALUE 212e
DATA VALUE 214e

FIG. 2

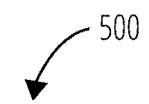

502

GENERATE PREDICTIONS FOR STRUCTURED INPUT DATA WITH A FIRST MACHINE LEARNING (ML) MODEL, THE STRUCTURED INPUT DATA COMPRISING A PLURALITY OF DATA VALUES

504

PROVIDE THE PREDICTIONS AS INPUT TO A SECOND ML MODEL, WHEREIN THE PREDICTIONS COMPRISE, FOR EACH DATA VALUE IN THE PLURALITY OF DATA VALUES, A SET OF PROBABILITIES THAT A RESPECTIVE DATA VALUE BELONGS TO EACH OF A SET OF CLASSIFICATIONS CORRESPONDING TO THE SET OF PROBABILITIES

506

GENERATE REVISED PREDICTIONS FOR THE STRUCTURED INPUT DATA WITH THE SECOND ML MODEL BASED ON THE INPUT, THE REVISED PREDICTIONS TO INCREASE A FIRST PROBABILITY ASSOCIATED WITH A DATA VALUE OF THE PLURALITY OF DATA VALUES AND DECREASE A SECOND PROBABILITY ASSOCIATED WITH THE DATA VALUE, WHEREIN THE FIRST PROBABILITY INDICATES A LIKELIHOOD THE DATA VALUE BELONGS TO A FIRST CLASSIFICATION AND THE SECOND PROBABILITY INDICATES A LIKELIHOOD THE DATA VALUE BELONGS TO A SECOND CLASSIFICATION

FIG. 5

APPARATUS AND METHOD FOR REVISING CATEGORY CLASSIFICATION PREDICTIONS IN MACHINE LEARNING

FIELD

The present disclosure relates generally to the field of artificial intelligence based modeling. In particular, the present disclosure relates to devices, systems, and methods to utilize machine learning models to revise category classification predictions.

BACKGROUND

Machine learning is the study of computer algorithms that improve automatically through experience. Typically, machine learning algorithms build a model based on sample data, referred to as training data, in order to make predictions or decisions without explicitly being programmed to do so. Oftentimes, machine learning models are trained to classify data into one or more categories based on sample data. For example, a machine learning model may be trained to identify cat images based on a sample set of cat images.

BRIEF SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In one aspect, the present disclosure relates an apparatus comprising a processor and a memory comprising instructions that when executed by the processor cause the processor to perform one or more of generate predictions for structured input data with a first machine learning (ML) model, the structured input data comprising a plurality of data values; provide the predictions as input to a second ML model, wherein the predictions comprise, for each data value in the plurality of data values, a set of probabilities that a respective data value belongs to each of a set of classifications corresponding to the set of probabilities; and generate revised predictions for the structured input data with the second ML model based on the input, the revised predictions to increase a first probability associated with a data value of the plurality of data values and decrease a second probability associated with the data value, and wherein the first probability indicates a likelihood the data value belongs to a first classification and the second probability indicates a likelihood the data value belongs to a second classification.

In various embodiments, the first classification comprises an account number classification and the second classification comprising a phone number classification. In some embodiments, the first ML model comprises a convolutional neural network. In many embodiments, the second ML model comprises an artificial recurrent neural network or a dilated convolutional neural network. In several embodiments, the second ML model comprises a long short-term memory. In multiple embodiments, the structured input data comprises a data array of the plurality of data values. In multiple such embodiments, the second ML model utilizes a structure of the data array to identify patterns in probabilities associated with the plurality of data values. In various such embodiments, the structure of the data array comprises columns and the pattern comprising a column of data values classified as an address are more likely adjacent to a column of data values classified as phone numbers than a column of data values classified as account numbers. In some embodiments, the instructions, when executed by the processor, further cause the processor to train the second ML model using prediction data output by the first ML model.

In another aspect, the present disclosure relates to at least one non-transitory computer-readable medium comprising a set of instructions that, in response to being executed by a processor circuit, cause the processor circuit to perform one or more of generate predictions for structured input data with a first machine learning (ML) model, the structured input data comprising a plurality of data values; provide the predictions as input to a second ML model, wherein the predictions comprise, for each data value in the plurality of data values, a set of probabilities that a respective data value belongs to each of a set of classifications corresponding to the set of probabilities; and generate revised predictions for the structured input data with the second ML model based on the input, the revised predictions to increase a first probability associated with a data value of the plurality of data values and decrease a second probability associated with the data value, and wherein the first probability indicates a likelihood the data value belongs to a first classification and the second probability indicates a likelihood the data value belongs to a second classification.

In various embodiments, the first classification comprises an account number classification and the second classification comprising a phone number classification. In some embodiments, the first ML model comprises a convolutional neural network. In many embodiments, the second ML model comprises an artificial recurrent neural network or a dilated convolutional neural network. In several embodiments, the second ML model comprises a long short-term memory. In multiple embodiments, the structured input data comprises a data array of the plurality of data values and the second ML model utilizes a structure of the data array to identify patterns in probabilities associated with the plurality of data values. In one embodiment, the set of instructions, in response to execution by the processor circuit, further cause the processor circuit to train the second ML model using prediction data output by the first ML model.

In yet another aspect, the present disclosure relates to a computer-implemented method comprising one or more of generating predictions for structured input data with a first machine learning (ML) model, the structured input data comprising a plurality of data values; providing the predictions as input to a second ML model, wherein the predictions comprise, for each data value in the plurality of data values, a set of probabilities that a respective data value belongs to each of a set of classifications corresponding to the set of probabilities; and generating revised predictions for the structured input data with the second ML model based on the input, the revised predictions to increase a first probability associated with a data value of the plurality of data values and decrease a second probability associated with the data value, and wherein the first probability indicates a likelihood the data value belongs to a first classification and the second probability indicates a likelihood the data value belongs to a second classification.

In various embodiments, the structured input data comprises a data array of the plurality of data values and the second ML model utilizes a structure of the data array to identify patterns in probabilities associated with the plurality of data values. In some embodiments, the structure of the data array comprises columns and the pattern comprising a column of data values classified as an address are more likely adjacent to a column of data values classified as phone numbers than a column of data values classified as account numbers. Many embodiments include training the second ML model using prediction data output by the first ML model.

BRIEF DESCRIPTION OF THE SEVERAL VIEWS OF THE DRAWINGS

FIG. 2 illustrates exemplary structured input data according to one or more embodiments described hereby.

FIG. 5 illustrates an exemplary logic flow according to one or more embodiments described hereby.

DETAILED DESCRIPTION

Figure 1:
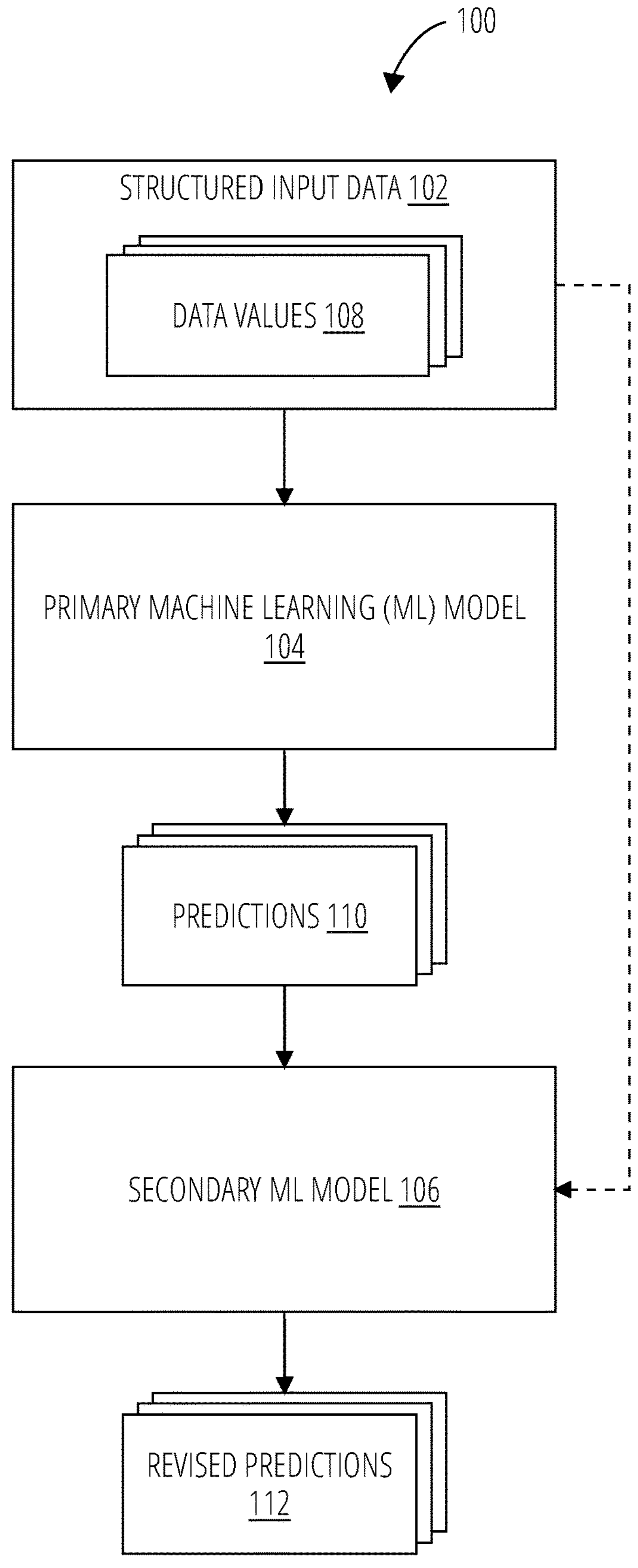
FIG. 1 illustrates an exemplary operating environment according to one or more embodiments described hereby.

Various embodiments are generally directed to techniques for prediction based machine learning (ML) models, such as to utilize a ML model to generate predictions based on the output of another ML model. Some embodiments are particularly directed to a secondary ML model that revises predictions generated by a primary ML model based on structured input data. In many embodiments, the secondary ML model may utilize predictions from the primary ML model to learn metadata regarding the structured input data. In many such embodiments, the metadata regarding the structured input data may be used to revise the predictions from the primary ML model. For example, the secondary ML model may utilize a structure of the input data combined with patterns in the predictions from the primary ML model to revise the predictions from the primary ML model. These and other embodiments are described and claimed.

Some challenges facing ML models include classifying unlabeled data, such as with respect to determining data type for structured input data without metadata. For instance, vast quantities of data structured into an array may be generated as part of enterprise operations. However, oftentimes, the data is not labeled or requires extensive manual analysis to correlate them with other data objects. For example, differentiating a column with phone numbers from a column with bank account numbers can be exceedingly difficult when the columns are not labeled. Adding further complexity, data type determination can be important for creating accurate and useful predictive models. For example, knowing different data types can trigger different techniques for feature engineering and model selection. Additionally, data type detection can help sorting data sources to an appropriate ontology as well as assisting with detecting sensitive information. However, in some cases, due to the lack of additional data (e.g., column headers), the detected probability is low for specific columns in structured datasets. These and other factors may result in lost efficiencies and underutilization of data objects, resulting in data objects with reduced applicability and poor adaptability, such as with respect to machine learning (ML) techniques. Such limitations can drastically reduce the usability of data objects, contributing to lost economies of scale, excessive data waste, and inefficient systems, devices, and techniques.

Various embodiments described hereby include a secondary ML model that implicitly learns metadata regarding structured input data based on predictions generated for the structured input data by a primary ML model. In many embodiments, the metadata may be utilized by the secondary ML model to improve one or more predictions of the primary ML model. In several embodiments, the secondary ML model may utilize a structure of the input data combined with patterns in the predictions from the primary ML model to revise the predictions from the primary ML model. For example, the structure of the input data may include an array and the pattern may include that a column of data values classified as addresses are more likely adjacent to a column of data values classified as account numbers. In such examples, the secondary ML model may increase the probability of data values in the column adjacent to data values classified as addresses being phone numbers and decrease the probability of data values in the column adjacent to data values classified as addresses being account numbers. In some embodiments, the insights into data provided by the secondary ML model may be utilized to improve security. For example, determining a data value is a bank account number may also be used to determine the data value is confidential and should be redacted or obscured. In various embodiments, the input data may include a frame from a sliding window, such as on a large array of data. One or more of the components and/or techniques disclosed hereby may be used as part of a process to automatically classify, correlate, and/or profile data to increase usability of data, resulting in more efficient and increased data utilization.

One or more techniques described hereby may facilitate accurate characterization of data by utilizing a secondary ML model to improve the predictions of a primary ML model, leading to useful and previously unknown relationships between data being identified, such as classifications of data entries in a structured data set. In these and other ways, components/techniques described here may identify methods to increase efficiency, decrease performance costs, decrease computational cost, and/or reduce resource requirements to classify, correlate, and/or profile data in an accurate, reactive, efficient, dynamic, and scalable manner, resulting in several technical effects and advantages over conventional computer technology, including increased capabilities and improved adaptability. In various embodiments, one or more of the aspects, techniques, and/or components described hereby may be implemented in a practical application via one or more computing devices, and thereby provide additional and useful functionality to the one or more computing devices, resulting in more capable, better functioning, and improved computing devices. Further, one or more of the aspects, techniques, and/or components described hereby may be utilized to improve the technical fields of data management, embedding spaces, data analysis, and/or machine learning. Embodiments disclosed hereby may be used to improve existing ML models.

In several embodiments, components described hereby may provide specific and particular manners of to improve classification of data to optimize utilization of the data, such as by improving data type detection. In several such embodiments, the specific and particular manners of improving classification of data may include one or more of utilizing a secondary ML model to revise predictions made by a primary ML model, implicitly learning metadata regarding structured input data based on predictions generated for the structured input data by the primary ML model, and utilizing predictions generated by the primary ML model in combination with a structure of the input data to revise predictions made by the primary ML model.

In many embodiments, one or more of the components described hereby may be implemented as a set of rules that improve computer-related technology by allowing a function not previously performable by a computer that enables an improved technological result to be achieved. For example, the function allowed may include one or more of: generating revised predictions for the structured input data with the second ML model based on the input, the revised predictions to increase a first probability associated with a data value of the plurality of data values and decrease a second probability associated with the data value, wherein the first probability indicates a likelihood the data value belongs to a first classification and the second probability indicates a likelihood the data value belongs to a second classification and utilizing a structure of input data comprising a data array to identify patterns in probabilities generated by a primary ML model based on the input data.

With general reference to notations and nomenclature used hereby, one or more portions of the detailed description which follows may be presented in terms of program procedures executed on a computer or network of computers. These procedural descriptions and representations are used by those skilled in the art to effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in many cases, in any of the operations described hereby that form part of one or more embodiments. Rather, these operations are machine operations. Useful machines for performing operations of various embodiments include general purpose digital computers as selectively activated or configured by a computer program stored within that is written in accordance with the teachings hereby, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modifications, equivalents, and alternatives within the scope of the claims.

FIG. 1 illustrates an exemplary operating environment 100 according to one or more embodiments described hereby. Operating environment 100 may include structured input data 102 with data values 108, primary ML model 104, predictions 110, secondary ML model 106, and revised predictions 112. In several embodiments described hereby, primary ML model 104 may generate predictions 110 based on structured input data 102 and secondary ML model 106 may generate revised predictions 112 based on the predictions 110. In several such embodiments, secondary ML model 106 may generate the revised predictions 112 based on predictions 110 and one or more portions of the structured input data 102. In some embodiments, FIG. 1 may include one or more components that are the same or similar to one or more other components of the present disclosure. Further, one or more components of FIG. 1, or aspects thereof, may be incorporated into other embodiments of the present disclosure, or excluded from the described embodiments, without departing from the scope of this disclosure. For example, secondary ML model 106 may generate revised predictions 112 without being directly provided structured input data 102 without departing from the scope of this disclosure. Still further, one or more components of other embodiments of the present disclosure, or aspects thereof, may be incorporated into one or more components of FIG. 1, without departing from the scope of this disclosure. Embodiments are not limited in this context.

In many embodiments, the primary ML model 104 and secondary ML model 106 may be used to determine data types. For example, a column may be determined to include phone numbers, social security numbers, or credit card numbers. In many embodiments, the structured input data 102 may include an n×n array of data (e.g., a spreadsheet). Further, each of data values 108 may correspond to a data entry in the array of data.

FIG. 2 illustrates structured input data 202 according to one or more embodiments described hereby. In the illustrated embodiment, structured input data 202 includes data array 204 with data values 206*a*-214*e*. As shown in FIG. 2, data values with a common numerical identifier share a column and data values with a common alphabetical identifier share a row. In some embodiments, FIG. 2 may include one or more components that are the same or similar to one or more other components of the present disclosure. For example, structured input data 202 may be the same or similar to structured input data 102. Further, one or more components of FIG. 2, or aspects thereof, may be incorporated into other embodiments of the present disclosure, or excluded from the described embodiments, without departing from the scope of this disclosure. Still further, one or more components of other embodiments of the present disclosure, or aspects thereof, may be incorporated into one or more components of FIG. 2 without departing from the scope of this disclosure. Embodiments are not limited in this context.

In several embodiments, a secondary ML model may utilize a structure of the structured input data 202 combined with patterns in the predictions from the primary ML model to revise the predictions from the primary ML model. For example, the structure of the input data may include structured input data 202 with five columns and five rows and the pattern may include that a column of data values with addresses are more likely adjacent to a column of data values with account numbers. As will be described in more detail below, in such examples, the secondary ML model may increase the probability of data values in the column adjacent to data values classified as addresses being phone numbers and decrease the probability of data values in the column adjacent to data values classified as addresses being account numbers. In some embodiments, the insights into data provided by the secondary ML model may be utilized to improve security. For example, determining a data value is a bank account number may also be used to determine the data value is confidential and should be redacted or obscured. In various embodiments, the input data may include a frame from a sliding window, such as a frame including a subset of the rows of data array 204. For example, additional rows may be continuously added to data array 204 as data is received from users over time. In such examples, a frame may include a batch of new data. In some embodiments, the structured input data 202 may include key-value stores and/or JSON objects.

Figure 3A:
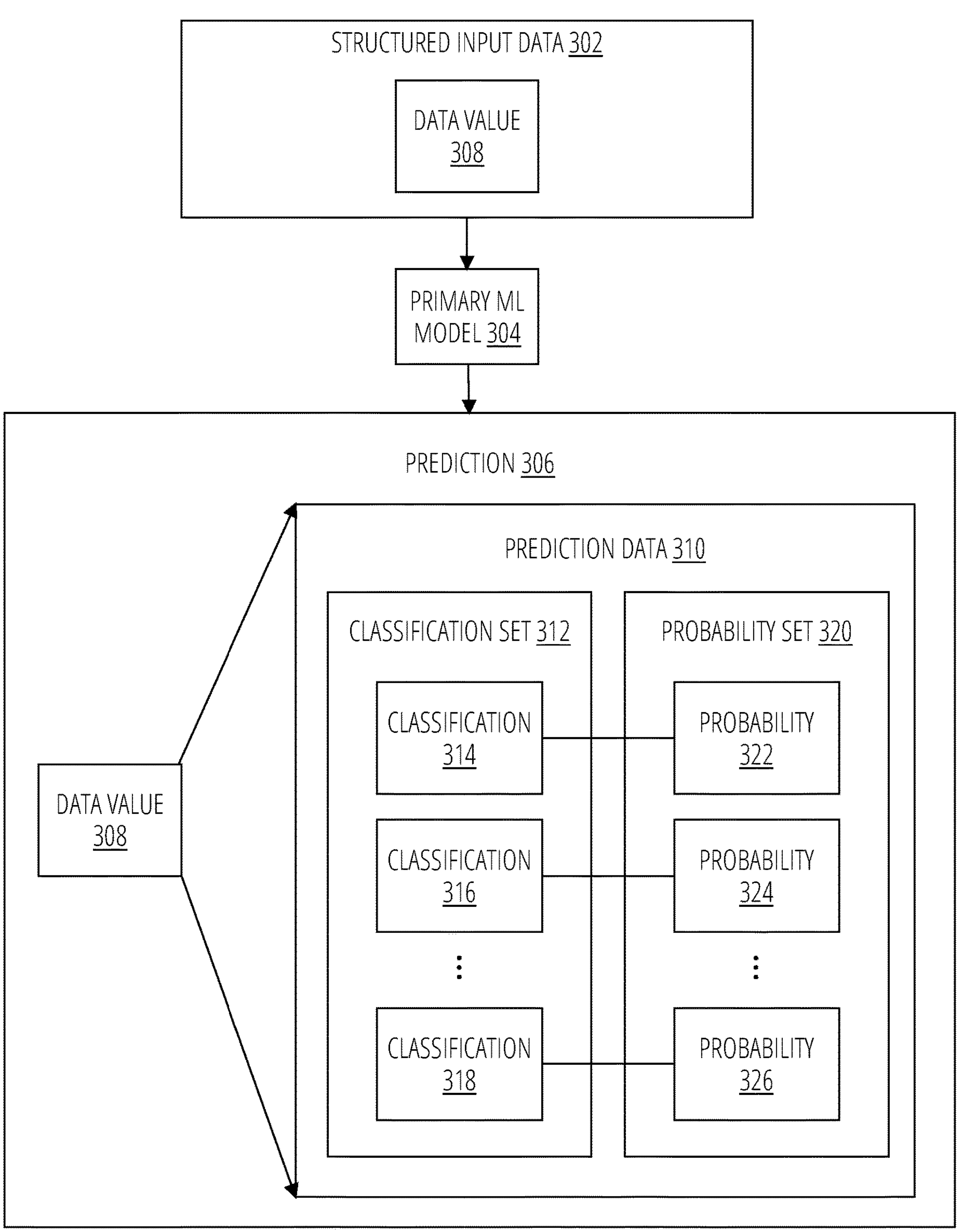
FIG. 3A illustrates various aspects of generating a prediction with a primary machine learning model according to one or more embodiments described hereby.
Figure 3B:
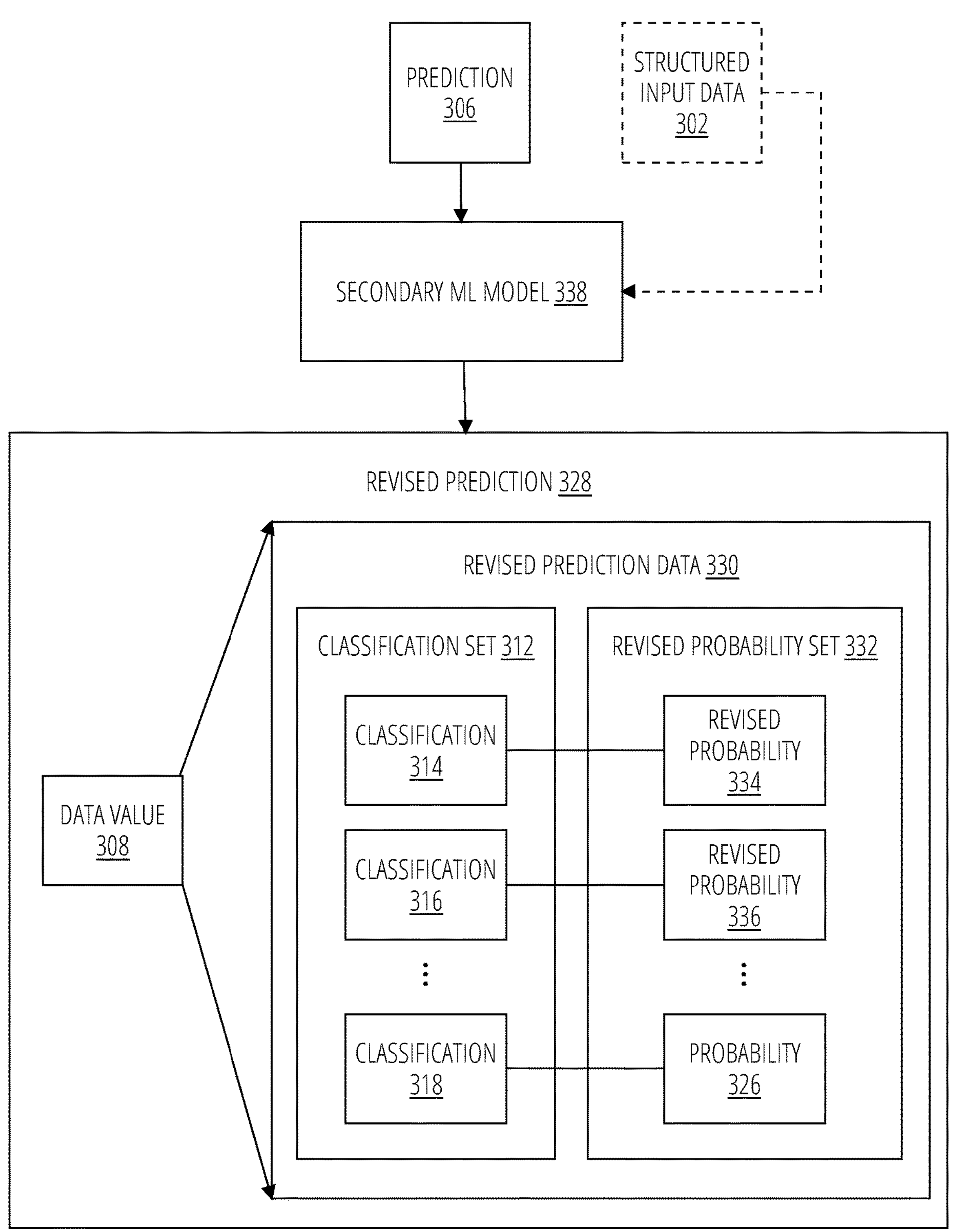
FIG. 3B illustrates various aspects of generating a revised prediction with a secondary machine learning model according to one or more embodiments described hereby.

FIGS. 3A and 3B illustrate various aspects of generating a revised prediction 328 based on structured input data 302 according to one or more embodiments described hereby. More specifically, FIG. 3A illustrates various aspects of generating a prediction 306 with a primary ML model 304 on a data value 308 and FIG. 3B illustrates various aspects of generating a revised prediction 328 with a secondary ML model 338. In some embodiments, FIGS. 3A and/or 3B may include one or more components that are the same or similar to one or more other components of the present disclosure. For example, data value 308 may be the same or similar to one of the data values in structured input data 202. Further, one or more components of FIGS. 3A and/or 3B, or aspects thereof, may be incorporated into other embodiments of the present disclosure, or excluded from the described embodiments, without departing from the scope of this disclosure. For example, primary ML model 304 may be excluded from an embodiment without departing from the scope of this disclosure, such as in an embodiment that receives predictions 306 from a third-party provider. Still further, one or more components of other embodiments of the present disclosure, or aspects thereof, may be incorporated into one or more components of FIGS. 3A and/or 3B without departing from the scope of this disclosure. Embodiments are not limited in this context.

Referring to FIG. 3A, the illustrated embodiment includes structured input data 302 with data value 308, primary ML model 304, and prediction 306. Prediction 306 includes prediction data 310 for data value 308. The prediction data 310 includes classification set 312 with classifications 314, 316, 318 and probability set 320 with probabilities 322, 324, 326. Further, classification 314 corresponds to probability 322, classification 316 corresponds to probability 324, and classification 318 corresponds to probability 326. In various embodiments, classification set 312 may include a number of classifications determined based on the input data. For example, the number of classifications may correspond to the number of columns in a data array. In another example, the number of classifications may be determined based on enterprise needs and objectives, such as when processing contact information each data value may belong to either name, address, phone number, or email.

Referring to FIG. 3B, the illustrated embodiment includes structured input data 302, prediction 306, secondary ML model 338, and revised prediction 328. Revised prediction 328 includes revised prediction data 330 for data value 308. The revised prediction data 330 includes classification set 312 with classifications 314, 316, 318 and revised probability set 332 with revised probabilities 334, 336, and probability 326. In revised prediction 328, probabilities 322, 324 have been replaced with revised probabilities 334, 336. In some embodiments, secondary ML model 338 may not receive structured input data 302 directly. For example, the output of the primary ML model 304 may retain sufficient characteristics of structured input data 302 for secondary ML model 338 to generate revised prediction data 330.

In many embodiments, secondary ML model 338 may implicitly learn metadata regarding structured input data 302 based on predictions 306 generated for the structured input data 302 by primary ML model 304. In several embodiments, the secondary ML model 338 may utilize a structure of the input data combined with patterns in the predictions 306 to revise the predictions 306 from the primary ML model 304. In many embodiments, the data, metadata and/or structure of the structured input data 302 may be utilized by the secondary ML model 338 to improve one or more predictions 306 of the primary ML model 304. For example, the structure of the input data may include an array and the pattern may include that a column of data values classified as addresses are more likely adjacent to a column of data values classified as account numbers. In such examples, the secondary ML model may increase the probability of data values in the column adjacent to data values classified as addresses being phone numbers and decrease the probability of data values in the column adjacent to data values classified as addresses being account numbers. In some embodiments, the insights into data provided by the secondary ML model may be utilized to improve security. For example, a user seeking contact information should be privy to phone numbers but not account numbers, thus determining a data value is a bank account number may be used to determine the data value is confidential and should be redacted or obscured.

Various embodiments described hereby may include a conversion agent to create and utilize multidimensional embedding spaces customized for predictions 306, such as to condition data for input to secondary ML model 338 (e.g., a long short-term memory or dilated convolutional neural network). Some embodiments include converting a set of structured input data 302 (e.g., an n×n array of data values 308), into object vector sets mapped to a multidimensional embedding space customized for the set of data objects. In many embodiments, an embedding space for a set of data objects may include a customizable set of dimensions. In many such embodiments, each dimension may correspond to a unique characteristic, or indication thereof, of the predictions 306 and/or structured input data 302. For example, one dimension may correspond to classifications of adjacent, or otherwise associated, data values). One or more embodiments described hereby may utilize the multi-dimensional embedding spaces to create an object vector set created from the predictions 306 and/or structured input data 302. In several embodiments, the conversion agent may map data into a multidimensional embedding space to facilitate classification of and/or correlation of and between the data values by secondary ML model 338. In various embodiments, the data may be mapped to a vector of real numbers. Further, the vector may represent a point in an n-dimensional space defined by the embedding space parameters. In some embodiments, the multidimensional embedding space may be customized based on the structured input data 302. In various embodiments, embedding spaces may include tens to thousands of dimensions.

Figure 4:
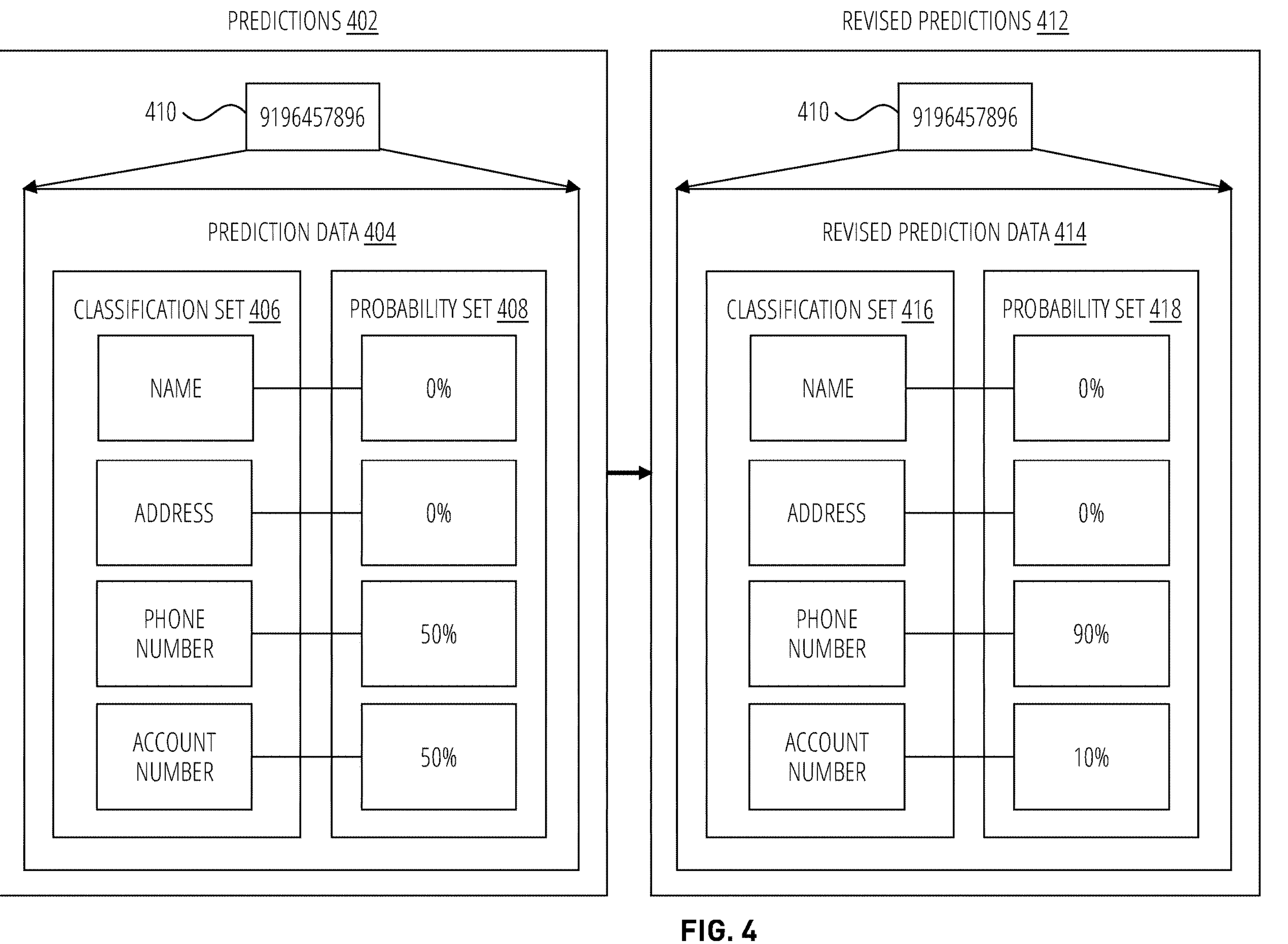
FIG. 4 illustrates predictions in conjunction with revised predictions according to one or more embodiments described hereby.

FIG. 4 illustrates predictions 402 in conjunction with revised predictions 412 according to one or more embodiments described hereby. In the illustrated embodiment, a first ML model may generate prediction data 404 for data value 410. In prediction data 404, data value 410 is classified as a phone number and a bank account with the same probability. However, in revised prediction data 414 of revised predictions 412, the probability of data value 410 being a phone number has increased to 90% and the probability of data value 410 being an account number has decreased to 10%. The adjustment to the probabilities may be the result of one or more secondary ML models disclosed hereby. As previously mentioned, the secondary ML model may utilize predictions 402 and/or one or more portions or aspects of the structured input data used to generate predictions 402 (e.g., a structure of the input data, such as an n×n array and the positions of each data value in the array). In some embodiments, FIG. 4 may include one or more components that are the same or similar to one or more other components of the present disclosure. For example, structured input predictions 402 may be the same or similar to predictions 110. Further, one or more components of FIG. 4, or aspects thereof, may be incorporated into other embodiments of the present disclosure, or excluded from the described embodiments, without departing from the scope of this disclosure. Still further, one or more components of other embodiments of the present disclosure, or aspects thereof, may be incorporated into one or more components of FIG. 4 without departing from the scope of this disclosure. For example, secondary ML model 338 may be utilized to generate revised predictions 412 based, at least in part, on predictions 402. Embodiments are not limited in this context.

FIG. 5 illustrates one embodiment of a logic flow 500, which may be representative of operations that may be executed in various embodiments in conjunction with techniques disclosed hereby. The logic flow 500 may be representative of some or all of the operations that may be executed by one or more components/devices/environments described hereby, such as primary ML models 104, 304 or secondary ML models 106, 338. The embodiments are not limited in this context.

At block 502 "generate predictions for structured input data with a first ML model, the structured input data comprising a plurality of data values" a first ML model may be used to generate predictions for structured input data that includes a plurality of data values. For example, predictions 110 for structured input data 202 may be generated by primary ML model 104. In many embodiments, structured input data 202 may include data array 204 with a plurality of data values **206*a*-214*e***.

Continuing to block 504 "provide the predictions as input to a second ML model, wherein the predictions comprise, for each data value in the plurality of data values, a set of probabilities that a respective data value belongs to each of a set of classifications corresponding to the set of probabilities" predictions comprising a set of probabilities for each data value in the plurality of data values that a respective data value belongs to each of a set of classifications may be provided as input to the second ML model. For example, prediction 306 may be provided to secondary ML model 338. Further, prediction 306 may include a set of probabilities 322, 324, 326 that data value 308 belongs to each of classifications 314, 316, 318.

Proceeding to block 506 "generate revised predictions for the structured input data with the second ML model based on the input, the revised predictions to increase a first probability associated with a data value of the plurality of data values and decrease a probability associated with the data value, wherein the first probability indicates a likelihood the data value belongs to a first classification and the second probability indicates a likelihood the data value belongs to a second classification" the predictions for the structured input data may be revised with the second ML model based on the input by increasing a first probability that indicates a likelihood the data value belongs to a first classification and decreasing a second probability that indicates a likelihood the data value belongs to a second classification. For example, secondary ML model 338 may generate revised prediction 412 based on prediction 402. Further, in some embodiments, the secondary ML model 338 may increase the probability that data value 410 belongs to a phone number classification and decrease the probability that data value 410 belongs to an account number classification.

Figure 6:
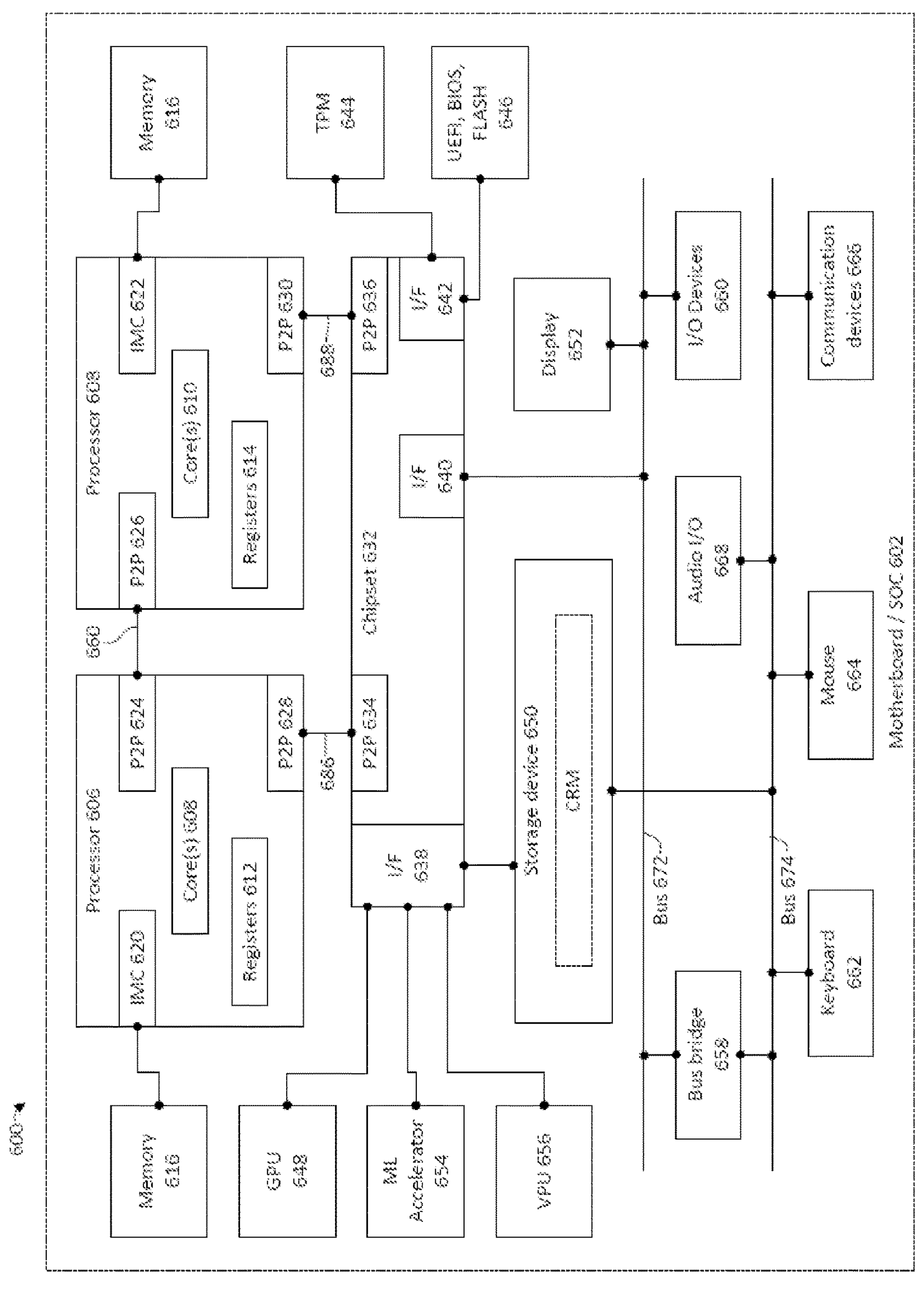
FIG. 6 illustrates exemplary aspects of a computing system according to one or more embodiments described hereby.

FIG. 6 illustrates an embodiment of a system 600 that may be suitable for implementing various embodiments described hereby. System 600 is a computing system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 600 may have a single processor with one core or more than one processor. Note that the term "processor" refers to a processor with a single core or a processor package with multiple processor cores. In at least one embodiment, the computing system 600, or one or more components thereof, is representative of one or more components described hereby, such as a user interface for interacting with, configuring, or implementing primary ML model 104 and/or secondary ML model 106. More generally, the computing system 600 is configured to implement all logic, systems, logic flows, methods, apparatuses, and functionality described hereby with reference to FIGS. 1-7. The embodiments are not limited in this context.

As used in this application, the terms "system" and "component" and "module" are intended to refer to a computer-related entity, either hardware, a combination of hardware and software, software, or software in execution, examples of which are provided by the exemplary system 600. For example, a component can be, but is not limited to being, a process running on a processor, a processor, a hard disk drive, multiple storage drives (of optical, solid-state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 600 comprises a motherboard or system-on-chip(SoC) 602 for mounting platform components. Motherboard or system-on-chip (SoC) 602 is a point-to-point (P2P) interconnect platform that includes a first processor 604 and a second processor 606 coupled via a point-to-point interconnect 670 such as an Ultra Path Interconnect (UPI). In other embodiments, the system 600 may be of another bus architecture, such as a multi-drop bus. Furthermore, each of processor 604 and processor 606 may be processor packages with multiple processor cores including core(s) 608 and core(s) 610, respectively. While the system 600 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 604 and chipset 632. Some platforms may include additional components and some platforms may only include sockets to mount the processors and/or the chipset. Furthermore, some platforms may not have sockets (e.g., SoC, or the like).

The processor 604 and processor 606 can be any of various commercially available processors, including without limitation Intel® processors; AMD® processors; ARM® processors; IBM® processors; and similar processors. Dual microprocessors, multi-core processors, and other multiprocessor architectures may also be employed as the processor 604 and/or processor 606. Additionally, the processor 604 need not be identical to processor 606.

Processor 604 includes an integrated memory controller (IMC) 620 and point-to-point (P2P) interface 624 and P2P interface 628. Similarly, the processor 606 includes an IMC 622 as well as P2P interface 626 and P2P interface 630. IMC 620 and IMC 622 couple the processors processor 604 and processor 606, respectively, to respective memories (e.g., memory 616 and memory 618). Memory 616 and memory 618 may be portions of the main memory (e.g., a dynamic random-access memory (DRAM)) for the platform such as double data rate type 3 (DDR3) or type 4 (DDR4) synchronous DRAM (SDRAM). In the present embodiment, the memory 616 and memory 618 locally attach to the respective processors (i.e., processor 604 and processor 606). In other embodiments, the main memory may couple with the processors via a bus and shared memory hub.

System 600 includes chipset 632 coupled to processor 604 and processor 606. Furthermore, chipset 632 can be coupled to storage device 650, for example, via an interface (I/F) 638. The I/F 638 may be, for example, a Peripheral Component Interconnect-enhanced (PCI-e). Storage device 650 can store instructions executable by circuitry of system 600 (e.g., processor 604, processor 606, GPU 648, ML accelerator 654, vision processing unit 656, or the like). For example, storage device 650 can store instructions for secondary ML model 106, secondary ML model 338, primary ML model 104, or the like. In another example, storage device 650 can store data, such as structured input data 102, predictions 110, or revised predictions 112.

Processor 604 couples to a chipset 632 via P2P interface 628 and P2P 634 while processor 606 couples to a chipset 632 via P2P interface 630 and P2P 636. Direct media interface (DMI) 676 and DMI 678 may couple the P2P interface 628 and the P2P 634 and the P2P interface 630 and P2P 636, respectively. DMI 676 and DMI 678 may be a high-speed interconnect that facilitates, e.g., eight Giga Transfers per second (GT/s) such as DMI 3.0. In other embodiments, the processor 604 and processor 606 may interconnect via a bus.

The chipset 632 may comprise a controller hub such as a platform controller hub (PCH). The chipset 632 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 632 may comprise more than one controller hub such as a chipset with a memory controller hub, a graphics controller hub, and an input/output (I/O) controller hub.

In the depicted example, chipset 632 couples with a trusted platform module (TPM) 644 and UEFI, BIOS, FLASH circuitry 646 via I/F 642. The TPM 644 is a dedicated microcontroller designed to secure hardware by integrating cryptographic keys into devices. The UEFI, BIOS, FLASH circuitry 646 may provide pre-boot code.

Furthermore, chipset 632 includes the I/F 638 to couple chipset 632 with a high-performance graphics engine, such as, graphics processing circuitry or a graphics processing unit (GPU) 648. In other embodiments, the system 600 may include a flexible display interface (FDI) (not shown) between the processor 604 and/or the processor 606 and the chipset 632. The FDI interconnects a graphics processor core in one or more of processor 604 and/or processor 606 with the chipset 632.

Additionally, ML accelerator 654 and/or vision processing unit 656 can be coupled to chipset 632 via I/F 638. ML accelerator 654 can be circuitry arranged to execute ML related operations (e.g., training, inference, etc.) for ML models. Likewise, vision processing unit 656 can be circuitry arranged to execute vision processing specific or related operations. In particular, ML accelerator 654 and/or vision processing unit 656 can be arranged to execute mathematical operations and/or operands useful for machine learning, neural network processing, artificial intelligence, vision processing, etc.

Various I/O devices 660 and display 652 couple to the bus 672, along with a bus bridge 658 which couples the bus 672 to a second bus 674 and an I/F 640 that connects the bus 672 with the chipset 632. In one embodiment, the second bus 674 may be a low pin count (LPC) bus. Various devices may couple to the second bus 674 including, for example, a keyboard 662, a mouse 664 and communication devices 666.

Furthermore, an audio I/O 668 may couple to second bus 674. Many of the I/O devices 660 and communication devices 666 may reside on the motherboard or system-on-chip (SoC) 602 while the keyboard 662 and the mouse 664 may be add-on peripherals. In other embodiments, some or all the I/O devices 660 and communication devices 666 are add-on peripherals and do not reside on the motherboard or system-on-chip (SoC) 602.

Figure 7:
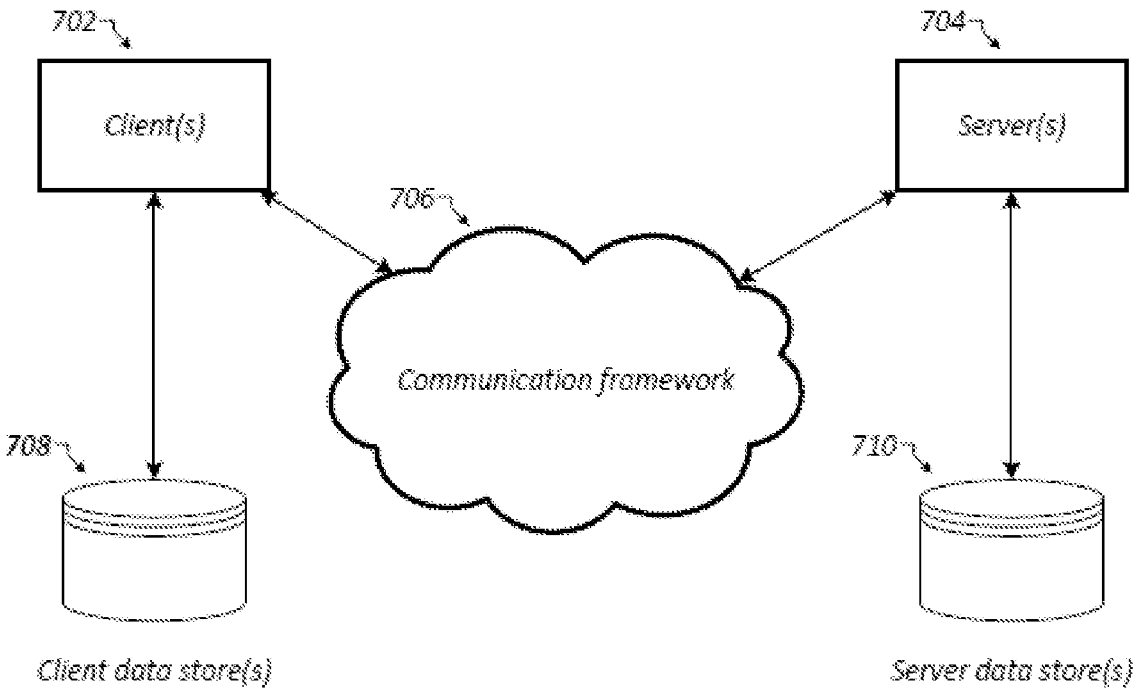
FIG. 7 illustrates exemplary aspects of a communications architecture according to one or more embodiments described hereby.

FIG. 7 illustrates a block diagram of an exemplary communications architecture 700 suitable for implementing various embodiments as previously described, such as communications between secondary ML model 106 and predictions 110 or primary ML model 104. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises one or more clients 702 and servers 704. In some embodiments, communications architecture may include or implement one or more portions of components, applications, and/or techniques described hereby. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described hereby, such as in conjunction with storage of data received from any one of clients 702 on any of server data stores 710. In one or more embodiments, one or more of client data store(s) 708 or server data store(s) 710 may include memory accessible to one or more portions of components, applications, and/or techniques described hereby.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100 (deleted)/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described hereby. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated hereby.

What is claimed is:

1. An apparatus, the apparatus comprising:

a processor; and memory comprising instructions that when executed by the processor cause the processor to:

access structured input data comprising a plurality of data values in a database;

using a conversion agent to convert the structured input data into object vector sets mapped to a multidimensional embedding space customized for the plurality of data values;

generate predictions for the structured input data by inputting the object vector sets into a first machine learning (ML) model, wherein each dimension in the multidimensional embedding space corresponds to a unique characteristic of the predictions or structured input data;

provide the predictions as input to a second ML model, wherein the predictions comprise, for each data value in the plurality of data values, a set of probabilities that a respective data value belongs to each of a set of classifications corresponding to the set of probabilities;

generate revised predictions for the structured input data with the second ML model based on the predictions generated by the first ML model, the revised predictions to increase a first probability associated with a data value of the plurality of data values and decrease a second probability associated with the data value, wherein the first probability indicates a likelihood the data value belongs to a first classification and the second probability indicates a likelihood the data value belongs to a second classification, and wherein metadata and other data regarding a structure of the structured input data is used by the second ML model to increase the first probability and decrease the second probability; and responsive to the first classification being an account number classification, and based on the predictions generated by the first ML model and the revised predictions generated by the second ML model, modify the data value in the database such that an account number of the data value is obscured.

2. The apparatus of claim 1, wherein the first classification comprises the account number classification and the second classification comprising a phone number classification.

3. The apparatus of claim 1, wherein the first ML model comprises a convolutional neural network.

4. The apparatus of claim 1, wherein the second ML model comprises an artificial recurrent neural network or a dilated convolutional neural network; and wherein the structured input data is also included as input into the second ML model to generate the revised predictions.

5. The apparatus of claim 4, wherein the second ML model comprises a long short-term memory; and wherein the second ML model is configured to implicitly learn metadata regarding the structured input data based on the predictions generated by the first ML model.

6. The apparatus of claim 1, wherein the structured input data comprises a data array of the plurality of data values.

7. The apparatus of claim 6, wherein the second ML model utilizes a structure of the data array to identify patterns in probabilities associated with the plurality of data values to thereby generate the revised prediction.

8. The apparatus of claim 7, wherein the structure of the data array comprises columns and the pattern comprising a column of data values classified as an address are more likely adjacent to a column of data values classified as phone numbers than a column of data values classified as account numbers.

9. The apparatus of claim 1, wherein the instructions, when executed by the processor, further cause the processor to train the second ML model using prediction data output by the first ML model; and wherein obscuring the account number of the data value includes the processor being caused to redact the account number of the data value.

10. At least one non-transitory computer-readable medium comprising a set of instructions that, in response to being executed by a processor circuit, cause the processor circuit to:

access structured input data comprising a plurality of data values in a database;

using a conversion agent to convert the structured input data into object vector sets mapped to a multidimensional embedding space customized for the plurality of data values;

generate predictions for the structured input data by inputting the object vector sets into a first machine learning (ML) model, wherein each dimension in the multidimensional embedding space corresponds to a unique characteristic of the predictions or structured input data;

provide the predictions as input to a second ML model, wherein the predictions comprise, for each data value in the plurality of data values, a set of probabilities that a respective data value belongs to each of a set of classifications corresponding to the set of probabilities;

generate revised predictions for the structured input data with the second ML model based on the predictions generated by the first ML model, the revised predictions to increase a first probability associated with a data value of the plurality of data values and decrease a second probability associated with the data value, wherein the first probability indicates a likelihood the data value belongs to a first classification and the second probability indicates a likelihood the data value belongs to a second classification, and wherein metadata and other data regarding a structure of the structured input data is used by the second ML model to increase the first probability and decrease the second probability; and responsive to the first classification being an account number classification, and based on the predictions generated by the first ML model and the revised predictions generated by the second ML model, modify the data value in the database such that an account number of the data value is obscured.

11. The non-transitory computer-readable medium of claim 10, wherein the first classification comprises the account number classification and the second classification comprising a phone number classification.

12. The non-transitory computer-readable medium of claim 10, wherein the first ML model comprises a convolutional neural network.

13. The non-transitory computer-readable medium of claim 10, wherein the second ML model comprises an artificial recurrent neural network or a dilated convolutional neural network; and wherein the structured input data is also included as input into the second ML model to generate the revised predictions.

14. The non-transitory computer-readable medium of claim 10, wherein the second ML model comprises a long short-term memory; and wherein the second ML model is configured to implicitly learn metadata regarding the structured input data based on the predictions generated by the first ML model.

15. The non-transitory computer-readable medium of claim 10, wherein the structured input data comprises a data array of the plurality of data values and the second ML model utilizes a structure of the data array to identify patterns in probabilities associated with the plurality of data values to thereby generate the revised prediction.

16. The non-transitory computer-readable medium of claim 10, wherein the set of instructions, in response to execution by the processor circuit, further cause the processor circuit to train the second ML model using prediction data output by the first ML model; and wherein obscuring the account number of the data value includes the processor being caused to redact the account number of the data value.

17. A computer-implemented method, comprising:

accessing structured input data comprising a plurality of data values in a database;

using a conversion agent to convert the structured input data into object vector sets mapped to a multidimensional embedding space customized for the plurality of data values;

generating predictions for the structured input data by inputting the object vector sets into a first machine learning (ML) model, wherein each dimension in the multidimensional embedding space corresponds to a unique characteristic of the predictions or structured input data;

providing the predictions as input to a second ML model, wherein the predictions comprise, for each data value in the plurality of data values, a set of probabilities that a respective data value belongs to each of a set of classifications corresponding to the set of probabilities;

generating revised predictions for the structured input data with the second ML model based on the predictions generated by the first ML model, the revised predictions to increase a first probability associated with a data value of the plurality of data values and decrease a second probability associated with the data value, wherein the first probability indicates a likelihood the data value belongs to a first classification and the second probability indicates a likelihood the data value belongs to a second classification, and wherein metadata and other data regarding a structure of the structured input data is used by the second ML model to increase the first probability and decrease the second probability; and responsive to the first classification being an account number classification, and based on the predictions generated by the first ML model and the revised predictions generated by the second ML model, modifying the data value in the database such that an account number of the data value is obscured.

18. The computer implemented method of claim 17, wherein the structured input data comprises a data array of the plurality of data values and the second ML model utilizes a structure of the data array to identify patterns in probabilities associated with the plurality of data values;

wherein the structured input data is also included as input into the second ML model to generate the revised predictions;

wherein the second ML model is configured to implicitly learn metadata regarding the structured input data based on the predictions generated by the first ML model; and wherein obscuring the account number of the data value includes redacting the account number of the data value.

19. The computer implemented method of claim 18, wherein the structure of the data array comprises columns and the pattern comprising a column of data values classified as an address are more likely adjacent to a column of data values classified as phone numbers than a column of data values classified as account numbers.

20. The computer implemented method of claim 17, comprising training the second ML model using prediction data output by the first ML model.

* * * * *